(12) United States Patent
Millsap et al.

(10) Patent No.: US 6,868,388 B1
(45) Date of Patent: Mar. 15, 2005

(54) INTEGRATED VOICE AND DATA SYSTEM AND AUTO RETAIL CHANNEL NETWORK PORTAL

(75) Inventors: Donald W. Millsap, Beavercreek, OH (US); Edward C. Becker, Kettering, OH (US); Dwayne E. Reeves, Enon, OH (US); John Simpson, Beavercreek, OH (US); Dan Mevis, Dayton, OH (US)

(73) Assignee: Reynolds and Reynolds Holdings, Inc., Dayton, OH (US)

( * ) Notice: Subject to any disclaimer, the term of this patent is extended or adjusted under 35 U.S.C. 154(b) by 385 days.

(21) Appl. No.: 09/621,350

(22) Filed: Jul. 21, 2000

Related U.S. Application Data
(60) Provisional application No. 60/176,621, filed on Jan. 19, 2000.

(51) Int. Cl.[7] .............................................. G06F 17/60
(52) U.S. Cl. .................................. 705/7; 705/1; 705/26
(58) Field of Search .................. 705/1, 7, 26; 709/238, 709/250

(56) References Cited

U.S. PATENT DOCUMENTS

| | | | |
|---|---|---|---|
| 3,245,045 A | | 4/1966 | Randlev ...................... 710/46 |
| 5,373,550 A | * | 12/1994 | Campbell et al. ...... 379/100.11 |
| 5,396,417 A | * | 3/1995 | Burks et al. ................... 705/17 |
| 5,410,675 A | * | 4/1995 | Shreve et al. ................. 710/65 |
| 5,420,981 A | | 5/1995 | Ivie et al. ..................... 709/227 |
| 5,652,841 A | * | 7/1997 | Nemirovsky et al. .......... 705/1 |
| 5,654,966 A | * | 8/1997 | Lester, Jr. et al. .......... 370/392 |
| 5,674,003 A | | 10/1997 | Andersen et al. ........... 709/228 |
| 5,694,551 A | * | 12/1997 | Doyle et al. .................. 705/26 |
| 5,720,035 A | | 2/1998 | Allegre et al. .............. 709/225 |
| 5,758,328 A | * | 5/1998 | Giovannoli .................. 705/26 |
| 5,794,234 A | * | 8/1998 | Church et al. ................. 707/4 |
| 5,828,893 A | | 10/1998 | Wied et al. .................. 709/229 |
| 5,864,683 A | | 1/1999 | Boebert et al. ............. 709/249 |
| 5,870,562 A | | 2/1999 | Butman et al. ............. 709/238 |
| 5,903,731 A | | 5/1999 | Vincent et al. ............. 709/226 |
| 5,909,493 A | | 6/1999 | Motoyama .................. 713/154 |
| 5,916,302 A | | 6/1999 | Dunn et al. ................. 709/204 |

(List continued on next page.)

FOREIGN PATENT DOCUMENTS

JP 8-137952 A * 5/1996

OTHER PUBLICATIONS

Fleming, M.V., "Bridging the Compatibility Gap: Transferring Information" (Abstract only), Office, vol. 106, No. 5, pp. 99–100, Nov. 1987.*

(List continued on next page.)

*Primary Examiner*—Nicholas D. Rosen
(74) *Attorney, Agent, or Firm*—Stephen C. Glazier; Kirkpatrick & Lockhart Nicholson Graham LLP

(57) ABSTRACT

The present invention is a network operation center which centrally connects multiple external computer systems belonging to automobile dealers, manufacturers, and vendors of goods and services. The network operation center provides centralized network security, allowing the dealers, manufacturers, and vendors to access certain portions of each other's data while protecting other data. It further provides data translation so that incompatible data formats and structures may be shared. Dealers communicate through the network operation center with multiple manufacturers and vendors with a single network connection, reducing the need for multiple individual connections to each manufacturer. Network support and updating of system hardware and software is centrally performed. Dealers lease access to a network operation center and accompanying data connections, along with technical support, hardware, and software from a single service provider. Alternatively, a single service provider independent of a network operation center may provide the data connections, hardware, software, and support.

33 Claims, 7 Drawing Sheets

U.S. PATENT DOCUMENTS

| | | | | |
|---|---|---|---|---|
| 5,954,793 | A | | 9/1999 | Stutman et al. ............. 709/204 |
| 5,970,472 | A | * | 10/1999 | Allsop et al. ................. 705/26 |
| 5,991,739 | A | * | 11/1999 | Cups et al. ................... 705/26 |
| 6,006,201 | A | * | 12/1999 | Berent et al. ................. 705/27 |
| 6,012,088 | A | * | 1/2000 | Li et al. ...................... 709/219 |
| 6,044,405 | A | * | 3/2000 | Driscoll, III et al. ....... 709/232 |
| 6,141,653 | A | * | 10/2000 | Conklin et al. ............... 705/80 |
| 6,148,290 | A | * | 11/2000 | Dan et al. ....................... 705/1 |
| 6,157,915 | A | * | 12/2000 | Bhaskaran et al. ............ 705/7 |
| 6,240,186 | B1 | * | 5/2001 | Hyde et al. .................. 380/255 |
| 6,301,574 | B1 | * | 10/2001 | Thomas et al. ................ 707/1 |
| 6,381,641 | B1 | * | 4/2002 | Iwasaki ...................... 709/224 |
| 6,446,045 | B1 | * | 9/2002 | Stone et al. .................. 705/26 |
| 6,449,597 | B1 | * | 9/2002 | McGill .......................... 705/1 |
| 6,457,049 | B2 | * | 9/2002 | Lewis et al. ................ 709/223 |
| 6,473,803 | B1 | * | 10/2002 | Stern et al. ................. 709/238 |
| 6,643,624 | B2 | * | 11/2003 | Philippe et al. ............... 705/26 |
| 2001/0034656 | A1 | * | 10/2001 | Lucas et al. .................. 705/26 |
| 2002/0069121 | A1 | * | 6/2002 | Jain et al. ..................... 705/26 |
| 2002/0165722 | A1 | * | 11/2002 | Luddy ........................... 705/1 |
| 2003/0139969 | A1 | * | 7/2003 | Scroggie et al. ............. 705/26 |

OTHER PUBLICATIONS

Morrissey, J., "Info Systems Refocus Priorities," Modern Healthcare, vol. 25, No. 7, p. 65+, Feb. 13, 1995.*

Goldstein, M.L., "Battling the Budget," Industry Week, vol. 233, P. 61, Jun. 15, 1987.*

Sumner, E.E., "The Operations Explosion (Communications Networks)," (Abstract only) International Journal of Computer Applications in Technology, vol. 2, No. 1, pp. 1–3.*

Eckerson, W., "Firms Use Wireless to Improve Service," Network World, vol. 9, No. 16, pp. 31–32, Apr. 20, 1982.*

Toigo, J.W., "Managing a Dial–up Network," Networking Magazine, vol. 11, No. 1, pp. 13–14, Jan. 1993.*

Anon., "Barrett Dissents as FSS Accelerates Cable Rate Rule Deadline," Communications Daily, vol. 13, No. 145, Jul. 29, 1993.*

Kretchmar, L., "How to Make the On–Line Connection," Working Woman, vol. 20, No. 1, pp. 50–51, Jan. 1995.*

Anon., "Leasing—What, Who, and Why?" Asset Finance and Leasing Difest, Canada Leasing Supplement, pp. 10–12, Apr. 1995.*

Levy, S., "The Rise of Internet Telephony," Datamation, vol. 42, No. 14, p. 64, Aug. 1996.*

Anon., "Hotmail," (Abstract only), Interactive Week, vol. 4, No. 30, p. 31, Sep. 8, 1997.*

O Heir, J., "Westcon Targeting Internet Resellers," Computer Reseller News, No. 758, p. 40, Oct. 13, 1997.*

Cole–Gomolski, B., "Sun Has 'Net Mail Server on Tap," Computerworld, vol. 31., No. 42, pp. 57–68, Oct. 20, 1997.*

Flanagan, P., "Putting it All Together: Has One–Stop Shopping Arrived?" Telecommunications (Americas Edition), vol. 31, No. 10, pp. 34–39, Oct. 1997.*

Anon., "Leasing Solutions: Vic Fischer Joins Leasing Solutions as Vice President Information Systems," Business Wire, Nov. 18, 1997.*

Microsoft Press Computer Dictionary, third edition, Microsoft Press, Redmond, pp. 276 and 507, 1997.*

Sainsbury, M., "Voice over the Net's Call Grows Louder," (Abstract only), ABIX—Australasian Business Intelligence, p. 14, Apri 28, 1998.*

Davis, B., "VPN Products Certified for Internet Security Standard," Inforamtionweek, No. 684, pp. 112–114, Jun. 1, 1998.*

Anon., "Growing Pains," Director, vol. 52, No. 4, p. 31, Nov. 1998.*

Anon., "AT&T Brings back Unlimited WorldNet Service, at a price," Newsbytes News Network, Dec. 15, 1998.*

Anon., "Personal Property: Inventory," Assessment Journal, vol. 6, No. 1, p. 71, Jan./Feb. 1999.*

Anon., "Conexant Debuts Industry's First Single–Chip, Multiport Line Interface Units for High–Bandwidth Communications," Business Wire, Mar. 30, 1999.*

Kenedy, K., "3Com Launches New Configuration Site as Part of Companywide Reorganization," Computer Reseller News, pag 6, May 31, 1999.*

Anon., "BBCN Announces World's First Online Echange for Auto Dealerships; Experts Plan to Change Industry with B2BE Site Boosting Profits for Dealers and Suppliers," PR Newswire, p. 4283, Dec. 16, 1999.*

Anon., "National Automobile Dealer Association Selects Hughes to Provide Comprehensive Auto Industry Network," News, Release, Dec. 14, 1990.*

Anon., "VSAT Network Drives Profitability" networking Management, vol. 10, No. 11, pp. 79–80, Oct. 1992.*

Muraskin, E., "Matchmaker, Matchmaker: AT&T Joins Web Site and Call Center," Computer Telephony, p. 242, Mar. 1997.*

Microsoft Press Computer Dictionary, Third Edition, Microsoft Press, Redmond, 1997, pp. 34, 199, 207, 267, 403, 404, 459, and 510.*

* cited by examiner

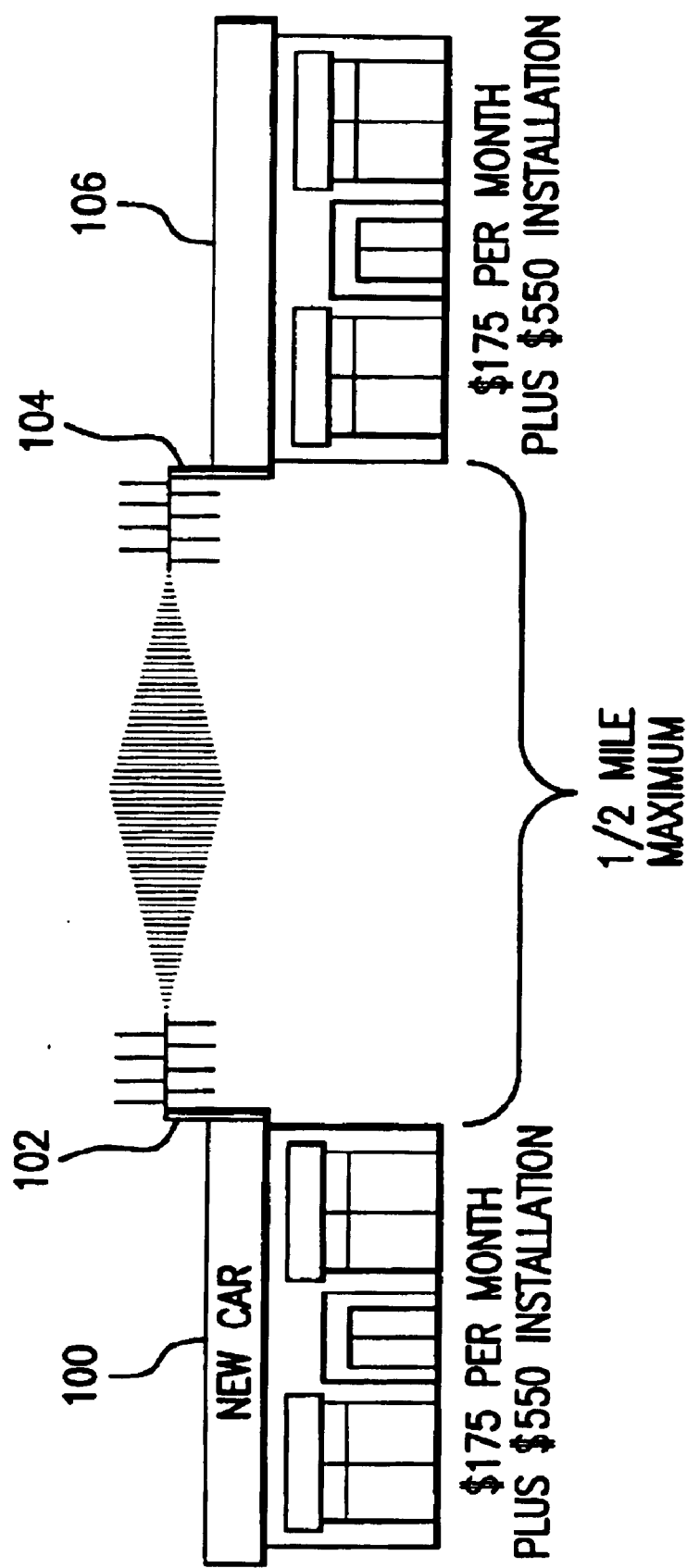

INTEGRATED VOICE AND DATA SYSTEM AND AUTO RETAIL CHANNEL NETWORK PORTAL

The present invention claims priority from U.S. Provisional Application 60/176,621 filed Jan. 19, 2000, herein incorporated by reference.

BACKGROUND OF THE INVENTION

1. Field of the Invention

The invention generally relates to an integrated voice and data system connecting automobile dealers with automobile manufacturers. More particularly, the invention relates to a system providing a network operation center which allows communication and other services to be provided to automobile dealers, suppliers and manufacturers. Also, the invention relates to a system of providing integrated telecommunications service from a single provider to automobile dealers. The two systems work independently or in combination and may include leasing of equipment and services.

2. Brief Description of the Related Art

The automotive retail industry has particular needs for network connectivity. Automobile manufacturers, customers, dealerships, financial institutions and suppliers would like to be able to work together and network connectivity simplifies this.

For example, it may be desirable for automobile manufacturers to have access to data from automobile dealers. This data could reflect inventories, sales figures, information on specific options selected by customers and other similar information. Auto dealerships are not likely to desire to spend large amounts of resources on databases, information technology staffing and data security. Additionally, in many cases, a single auto dealer will operate several stores or locations where he or she sells vehicles, perhaps from multiple automobile manufacturers. Moreover, individual dealerships may not use a standardized data format, but rather each may use a proprietary or publicly available database.

In addition to data access, car manufacturers would like to offer web based marketing and sales tools. Car dealers need access to these tools as well as Internet access for CarPoint, to offer web pages and the ability to email their customers.

The conventional solution to these problems is to use a complex combination of services requiring multiple Internet, email and satellite communications connections which do not work together.

FIG. 3 shows a schematic diagram of a prior art communications network. Several automobile stores each must maintain an Internet connection, a satellite dish and direct connections to associated manufacturers. As shown in the Figure, a single dealer may have several stores, each selling a different make of car. The multiple make dealer must separately be able to contact several different manufacturers from each individual store.

Further, dealers have several different applications which they use. There may be, for example, Toyota specific applications which must be maintained at the Toyota store, while at the GM store, GM specific applications are used. These applications are not integrated and incompatible.

This computer system infrastructure also requires dealers to have an information technology (IT) manager on staff or on a contract basis, present on the dealer's premises. Updates of equipment and software, as well as troubleshooting, must all be done on site.

FIG. 5 shows a schematic diagram of a prior art system of providing telecommunications service to automobile dealers. Multiple providers provide access to a frame relay network, long distance telecommunications, local telecommunications, hardware and software for use by a dealer. Having multiple providers leads to difficulty for the dealer, particularly when a failure occurs. An interruption in service requires multiple calls for support to determine which provider is responsible. Additionally, monthly bills come from multiple sources, requiring multiple payments to multiple parties.

BRIEF SUMMARY OF THE INVENTION

It is an object of the present invention to allow incompatible applications and data to be accessed through a single system. Further, it is an object of the present invention to allow automobile dealers, manufacturers and providers of related goods and services such as financial institutions and vendors to communicate with virtual compatibility.

It is a further object of the present invention to provide updates of software and equipment which are substantially centrally performed without the need for dealers to maintain on-site information technology (IT) professionals.

It is yet another object of the present invention to integrate communications systems so that a dealer with a multi-store network may reduce the overall need for multiple individual connections to each manufacturer.

It is another object of the present invention to provide an integrated source of voice and data communications to automobile dealerships wherein a single party provides access to a frame relay network, long distance and local telephone access, and telecommunications hardware and software.

It is yet another object of the present invention to provide telecommunications services including partially wireless campus networks, thereby reducing the need for leased landlines between campus buildings.

A. Network Portal Operation Center

To achieve the foregoing objects and to meet the needs of automobile dealers and manufacturers, one embodiment of the present invention provides a network operation center which centrally connects a plurality of external computer systems belonging to automobile dealers, manufacturers and vendors of goods and services to the automobile industry. The network operation center according to the present invention may provide centralized network security, allowing the dealers, manufacturers and vendors to access certain portions of each other's data while protecting other data. The network operation center according to the present invention may further provide data translation so that incompatible data formats and structures among the dealers manufacturers and vendors may be accessed and read. Dealers with a multi-store network may communicate through the network operation center with multiple manufacturers and vendors with a single network connection, reducing the need for multiple individual connections from each dealer directly to each manufacturer and vendor. Moreover, because the network operation center contains the software and hardware needed run the network, network support can be centrally performed, reducing dealers' need for IT staff.

More specifically, dealers may directly connect to the network operation center via a telecommunications link using a modem or a DSU/CSU, a piece of equipment that is used to manage digital transmissions and to monitor signals. Unlike a modem, a DSU/CSU does not convert digital information into analog signals. Thus, they are sometimes referred to as digital modems.

A virtual private network is formed, and via a frame relay or other type of network, the dealer provides the network operation center with access to data. Although a frame relay network is the currently preferable technology, it may not fit all auto dealerships. Since some small auto dealerships would find a frame relay connection overly expensive, dial-up connections may also be made available, such as ISDN or phone lines. Additionally, immature technologies such as cable modems and ASDL may be employed, as may other future technologies. Other DSL systems such as CDSL, HDSL, RADSL, IDSL, SDSL, UDSL and G.Lite may also be appropriate. These types of lines may generally be used for both data and voice communications.

The network operation center provides system security such as a shared firewall. It may also provide such resources as email, instant messaging and Internet telephony. When updates to software or equipment need to be made, much of the updating may be performed at the network operation center. Since most of the network computing load is performed at the network operation center, that is the equipment which will need to be most up to date. The dealerships need not always have the highest level of technology since their servers will not have a heavy load. Dealerships may operate PCs or even dumb terminals to access their data locally. This helps to achieve the goal of reducing the need for each dealer to maintain IT professionals on-site.

Further, the network operation center provides translation of data from whatever format the auto dealer has provided to a standardized format. Data in the standardized format may then be accessed by automobile manufacturers via an insecure network such as the Internet or via a direct connection with the network operation center. The network operations center provides, in its security scheme, the ability to allow each manufacturer access to data pertaining to it only. Thus, though a single dealer may operate several stores, selling several makes of auto, each manufacturer is restricted to data on cars produced by it.

By way of example, a plurality of automobile dealers, each with several stores send sales data to the network operation center. Dealer A operates both a Honda and a Buick store, Dealer B operates a Chevrolet, GMC Truck and a Oldsmobile store, and Dealer C operates a Honda and a Saab store. Thus, the network operation center has access to data representing three automobile manufacturers, Honda, GM and Saab. General Motors would access the network operation center and have access to part of Dealer A's data, all of Dealer B's data and none of Dealer C's data.

An automobile manufacturer may, for example, track a dealer's inventory. If the parts department were to run low on a particular item, the manufacturer could use that information to initiate an order, or could contact the dealership via email informing them that they should consider placing an order. Such monitoring of stock levels could also allow the manufacturer to better determine the appropriate production levels. If its dealerships have an oversupply or undersupply of starter motors, the production of starter motors could be cut back or increased, respectively.

Automotive dealers could, in turn, request information on orders already placed. The manufacturers could allow access to status of car, parts, supplies or any other orders placed by the dealerships. Manufacturers could provide statistics on which models were selling best throughout the country or in a dealer's specific region.

Moreover, customers could be involved as well. A customer with Internet access could be provided with access to parts ordering, pricing, information on what cars his local dealership has in stock and other data. The security system would be set up to allow certain queries by customers without allowing proprietary information to be delivered. Even if no direct customer access to data is required or desired, the auto dealerships may make use of Internet e-mail to interact with customers or to present a web page containing selected information.

The network operation center may provide network services including, but not limited to, Internet connectivity, Intranet connectivity, connectivity between auto dealerships and auto manufacturers, potentially including access to dealerships' local networks, e-mail, instant messaging, Domain Name Servers (DNS), automated Internet Protocol (IP) address inventory and tracking, security, firewalls, and data format translation.

This allows for all costs to be centralized, an auto dealership pays for a single connection to all car companies, and the Internet. Security through a firewall is provided for all non-dealer sites. There is no redundant cost for circuits or hardware. Any access problems are handled centrally, unlike the conventional system where a dealership may have to call an ISP, a manufacturer or a network contractor depending on the particular problem.

FIG. 3 shows a prior art communication network for a single dealer operating multiple stores. The dealer must pay for multiple access paths to the Internet through manufacturers and through ISPs. The manufacturers offer access only to sites that the specific manufacturer wants the dealer to reach, thus a single, multiple make dealer must have several of these types of connections, one for each manufacturer. The dealer still needs to purchase Internet access from another source to allow the use of email and web pages to reach customers and vendors. Multiple paths to the Internet can cause problems with selecting a default gateway. More importantly, multiple sources of service mean that it may be difficult to ascertain who is responsible for loss of service and who to call for repairs.

FIG. 4 shows the same dealer's communication network based around a network operation center. The dealer's local, wide-area, or metropolitan area network communicates with the network operation center directly as described below. The operation center then allows communication to all appropriate manufacturers with a single source and a single connection.

B. Integrated Voice and Data System

To achieve further the foregoing objects and to meet the needs of automobile dealers and manufacturers, a second embodiment of the present invention provides a method of delivering data communications services which integrates previously separate services and service providers. The integrated voice and data system (IVDS) of the present invention includes providing long distance data communication services, local access to the long distance communication services, communication lines, communications hardware equipment including a DSU/CSU and a router, and data software applications which communicate data through the communications hardware and over the communications services provided. The DSU/CSU, router, line connections and data software applications are leased to a user, and the communications services are sold, or resold, to the user.

As a result, the present invention allows all the telecommunications services needed by the automobile dealer to be provided from a single source. Rather than relying on several layers of providers, each delivering only a part of the package, the entire system may be leased from one provider. This enables the dealer to turn to a single provider when a portion of the system causes a problem, thereby eliminating the need to determine which provider to call and the potential for each provider to blame another.

FIG. 5 shows a prior art method of providing telecommunications services. Each portion of the service is provided by a different provider. Moreover, within the dealer's LAN each component may be provided from a different source, particularly with respect to hardware components which may each be from separate hardware suppliers. When there is a fault in the system, the dealer does not know if it lies in the local access provider's system, the public frame relay network, the long distance provider, or in the hardware or software which is local to the dealer. Separate support calls must be made to determine which party is responsible and how the problem will be solved. Moreover, separate billing is received each month from each provider, requiring multiple payment arrangements.

FIG. 6 shows a method of providing telecommunications services according to the present invention. Each physical element of the telecommunications network may be the same as in FIG. 5, however, all of the physical elements are provided to the automobile dealership by a single provider. Thus, if a problem occurs, the dealer has a single point of contact for support.

In a method of providing telecommunications services according to the present invention, the data communication lines, communication and network equipment and software is preferably leased, and the long distance data communication service, local access data communication service to the long distance carrier, local access service and communication line service are preferably sold (essentially re-sold) to the dealer.

A single bill is preferably generated for the IVDS service. Preferably, a first bill part which takes into account the amount of equipment leased and a rate for the equipment leased for a particular time period is generated for each time period and may be in either electronic or paper form. Preferably, a second bill part which takes into account the services (such as long distance data services, local access services and communications line services) and a rate for those services for a particular time, which is preferably the same time as that used for the first bill part, is generated for each time period and likewise may be in either electronic or paper form. The two bill parts are transmitted to the client as one bill.

FIG. 7 shows a system of wireless bridging which may be employed with the system of providing telecommunications service or separately. Wireless communications systems are provided which allow a detached location within a dealer's campus to be a part of the dealer's local area network (LAN). This allows a dealer to include multiple buildings in a single network without the need for copper or optical fiber land lines. Each physically separate portion of the network is bridged to the others via the wireless data communications system.

Finally, it should be noted that the network operation center, the method for providing IVDS telecommunications service, and the wireless bridging may be provided either individually or together as a whole. Together, they provide a complete system meeting all of the telecommunications needs of automobile dealerships, however, apart each meets specific important needs as well.

BRIEF DESCRIPTION OF THE FIGURES

FIG. 7 shows a schematic diagram of a LAN communications system according to the present invention.

DETAILED DESCRIPTION OF THE INVENTION

A. Network Portal Operation Center

Figure 1:
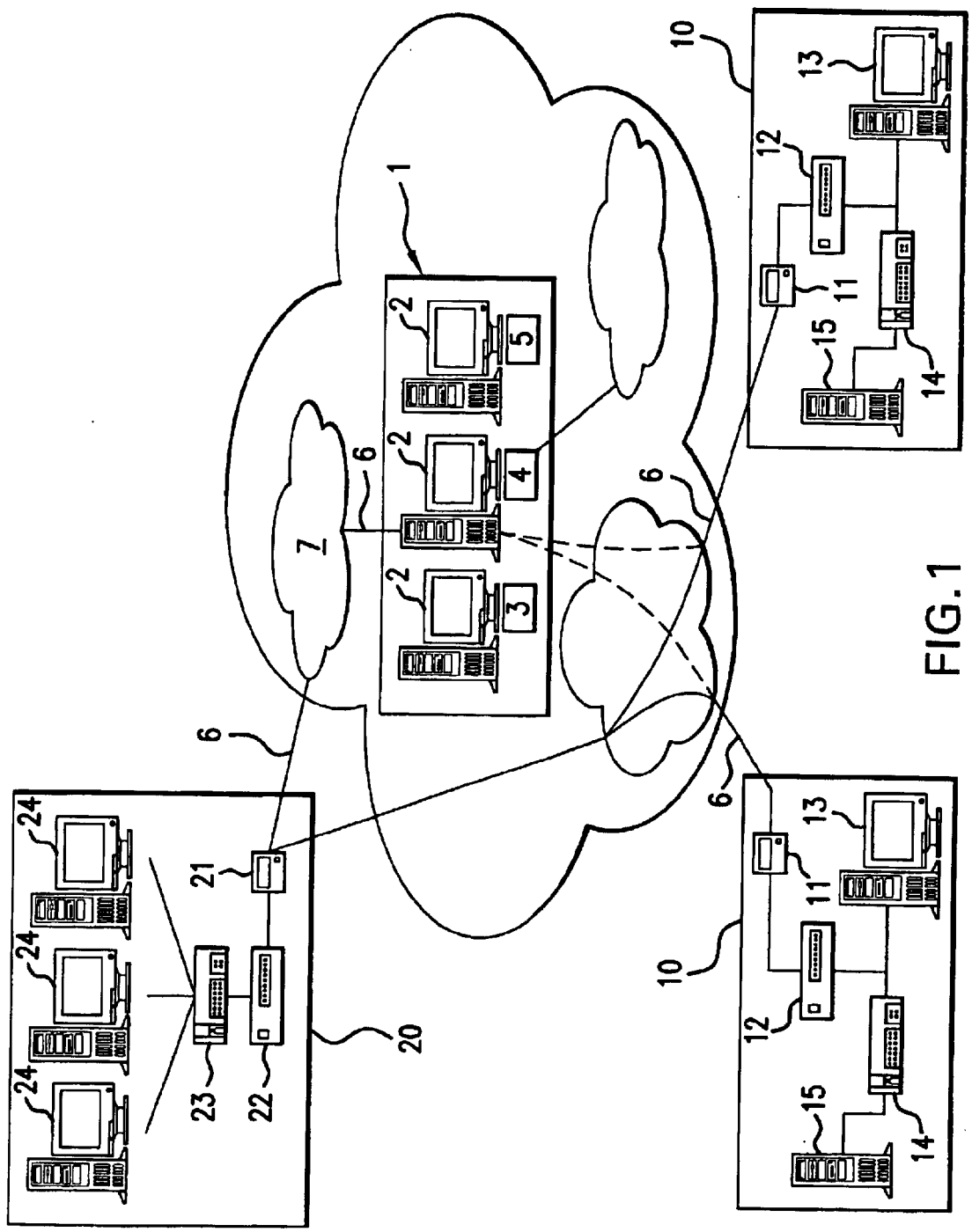
FIG. 1 shows an schematic diagram of a communications network, showing the relationship between a network operation center according to the present invention, individual automobile dealers and a manufacturer.

FIG. 1 shows an overview of the system. The network operation center 1 may be a single server 2, or more likely, a series of servers 2 working in concert. Software running on the servers provides shared resources such as a firewall 3, email 4 and other shared resources such as Internet access, instant messaging or Internet telephony 5. The network operation center 1 is in communication via connection 6 with the Internet 7 as well as a plurality of direct connections 6 with automobile dealers.

Each dealer 10 operates a modem or DSU/CSU 11 to connect with the network operation center 1. The modem or DSU/CSU 11 in turn is connected to a router 12. The router 12 connects to a PC or terminal 13. The router is also connected to a switch 14. The switch is connected to a server containing the dealer's database 15. Dealer's database 15 may be a standard one, provided by the network operation center 1, or may be proprietary. As a result, it is preferable to include as part of the network operations center 1, software for accepting database data in one format and converting it into a standard format. Data from the dealer 10 is transmitted to the network operation center 1 when requested by a manufacturer, converted into a standard format, and passed on to the requester.

The dealer 10 locally has full access to the database 15 through the PC or terminal 13. The database is also accessible from the network operation center 1.

The network operation center 1 is further connected via modem or DSU/CSU 21 to at least one automobile manufacturer 20. The manufacturer's modem or DSU/CSU connects to a router 22 which in turn connects to a switch 23. The switch 23 is, in turn, connected to a server or servers 24.

The auto manufacturer 20 has access to the Internet 7. The auto manufacturer 20 may, either through its direct connection with the network operation center 1 or via the Internet 7, access the databases 15. The network operation center 1 has security measures which allow the manufacturer 20 to only access data pertaining to automobile dealers 10 which sell its cars.

In one alternate arrangement, not shown, an auto dealer 10 may have several stores. In that case, the several stores may be arranged into a single network. Preferably, the network of stores will feed all of its data into a single database 15 which will then connect to the network operation center 1 as before. Otherwise, the network of stores may have a several databases 15. In that case, again each database 15 will be set up for access via the network operation center 1.

The connections 6 may advantageously be data links leased to the automobile dealerships and manufacturers by the same company which provides the network operation center. Such a data link may consist, for example, of a T-1 loop with two permanent virtual circuits. The auto dealerships and manufacturers may also lease other equipment such as a router and CSU/DSU, but in many cases will already own these pieces of equipment.

Figure 2:
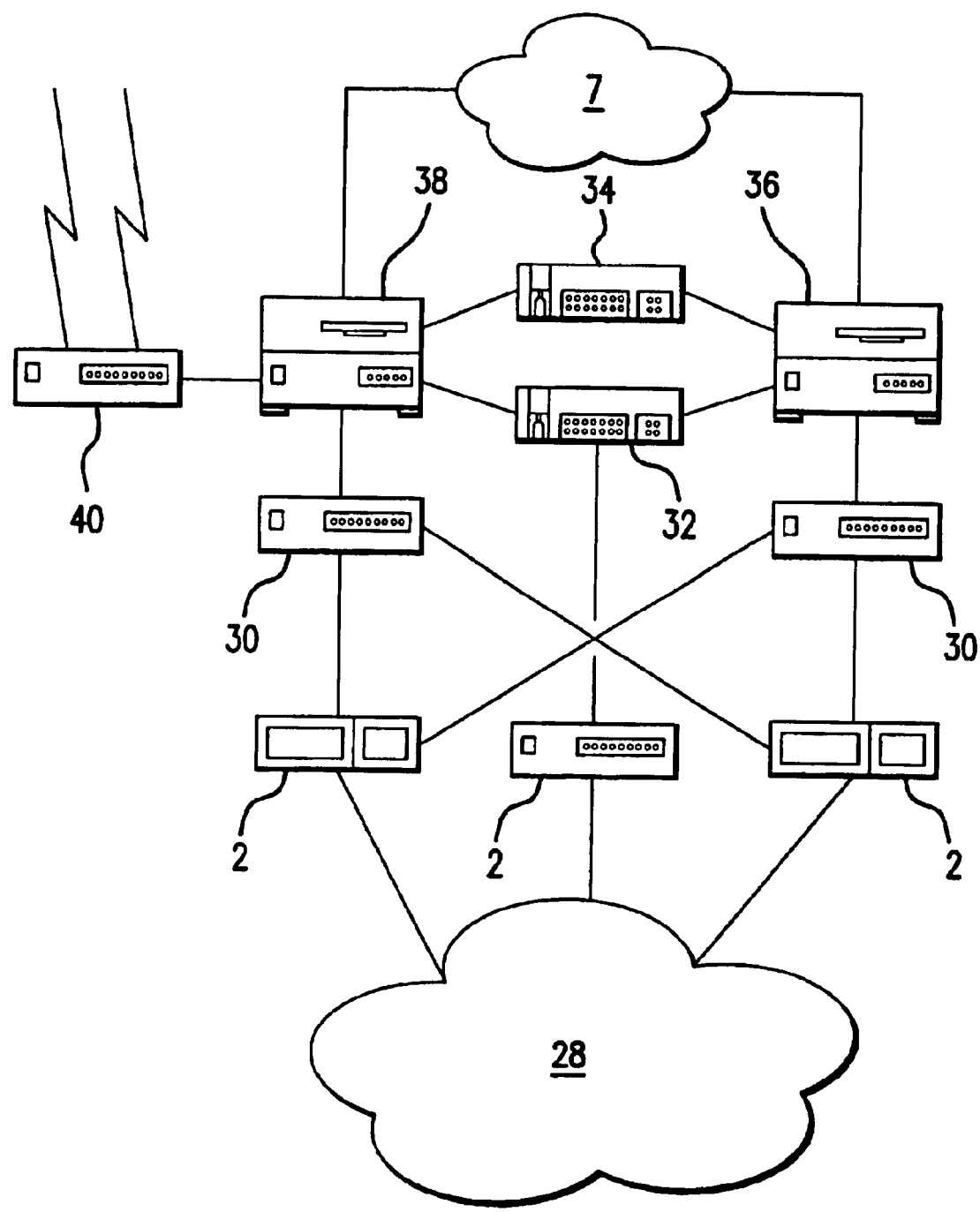
FIG. 2 shows a schematic diagram of the network operation center according to the present invention.

FIG. 2 shows the anatomy of one small scale embodiment of the network operation center 1 itself. A virtual private network, for example a frame relay network such as MCI/Worldcom's Managed Connections product, connects with three routers 2. Two of the routers 2 connect with a pair of switches 30 the other router 2 is connected to a command and control circuit that allows remote control and monitoring of portal assets. The two main routers allow access to portal assets which are located within a Private Demilatarized Zone (DMZ) or allows access to a public DMZ or Internet assets. A DMZ is a security measure in which a separate host receives requests from users within the private network for access to outside, publicly accessible networks, in particular, commonly the Internet and World Wide Web. The DMZ host initiates sessions for these requests on the public network. However, the public DMZ host is not able to initiate a session back into the private network. It can only forward packets that have already been requested.

Two firewalls act as the core of the security system. Firewalls 36, 38 control access to the public and private DMZ, all servers are connected to switch 34 for the public DMZ and switch 32 for the private DMZ. A pair of servers 36 and 38 provide all server functions.

The core routers limit route advertisements to the dealerships and also filter input packets based on destination addresses. For example, all requests coming from the Internet should be routed through the public DMZ. The public DMZ has a public DNS server, public SMTP servers and any other Internet accessible servers. The private DMZ contains private DNS servers, mail servers, manufacturer servers and any other dealership accessible, but not public accessible, servers.

The private DNS are the primary name servers for the auto dealerships. They are authoritative for all internal domains. They are also able to directly query the manufacturer DNS private trees. All queries from a dealership directed to an external hostname will be forced through the private DNS. The public DNS are the primary servers for communicating with public hosts and are authoritative for dealership public domains hosted within the portal. Additional benefit may be had by adding at each dealership a caching DNS. A caching DNS may serve as a main DNS for each dealership, thereby reducing WAN traffic by keeping as many DNS queries as possible local to the dealership. The caching DNS could, for example, be run on a Pentium class PC running Linux. The same machine could additionally provide DHCP, network monitoring and dialup management support for the dealership.

All DNS queries that cannot be found in the local name server's cache are forwarded to the private DMZ name servers. This insures that all public and manufacturer trees can be resolved successfully. The network operation center name servers act as secondary and tertiary name servers in case the local caching name server fails or doesn't have the appropriate information. Software can allow queries for manufacturers private trees to be sent directly to the manufacturer's private DNS servers. Public DNS queries are forwarded directly to the public root name servers. DNS queries from outside the network, such as those coming from the Internet are handled by the public DNS servers. Those servers may be advantageously set up to have information only about the hosts located in the public DMZ, thereby preventing access through those servers to the private DMZ.

For the purpose of data transmission, it is preferable that the network operation center provides translation of data from whatever format the auto dealer has provided to a standardized format. Auto dealerships use a variety of software systems such as ERA and ERA$^2$ by The Reynolds and Reynolds Company, of Dayton, Ohio, and various other inferior systems by ADP, Oracle, IBM, EDS and others. The network operation center would preferably be able to accept data in any of the formats used by those systems. In addition to format changes, the translation should allow for translation between flat and relational databases. To facilitate this and for other purposes the present invention may use and include the invention described in co-pending U.S. patent application No. 09/741,008, for PERFORMANCE PATH METHOD AND APPARATUS FOR EXCHANGING DATA AMONG SYSTEMS USING DIFFERENT DATA FORMATS, filed Dec. 21, 2000, which application is incorporated herein in its entirety by this reference.

An additional router 40 may be included for direct network access from automobile manufacturers. Alternately, the manufacturers may access the network operation center over the Internet 7 via a secure encrypted tunnel (i.e. IPSEC).

Figure 3:
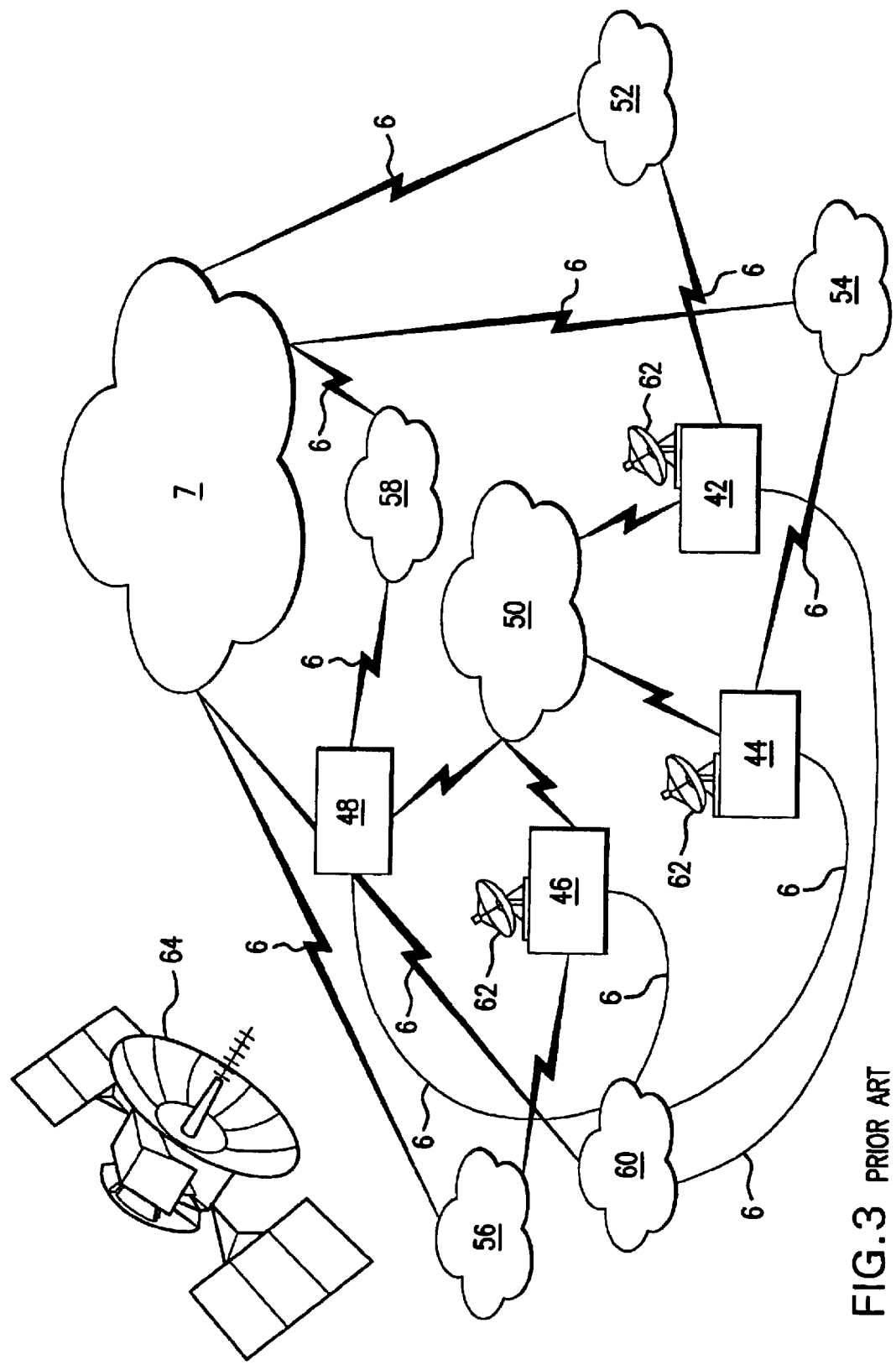
FIG. 3 shows a schematic diagram of a prior art auto dealer communications network.
Figure 4:
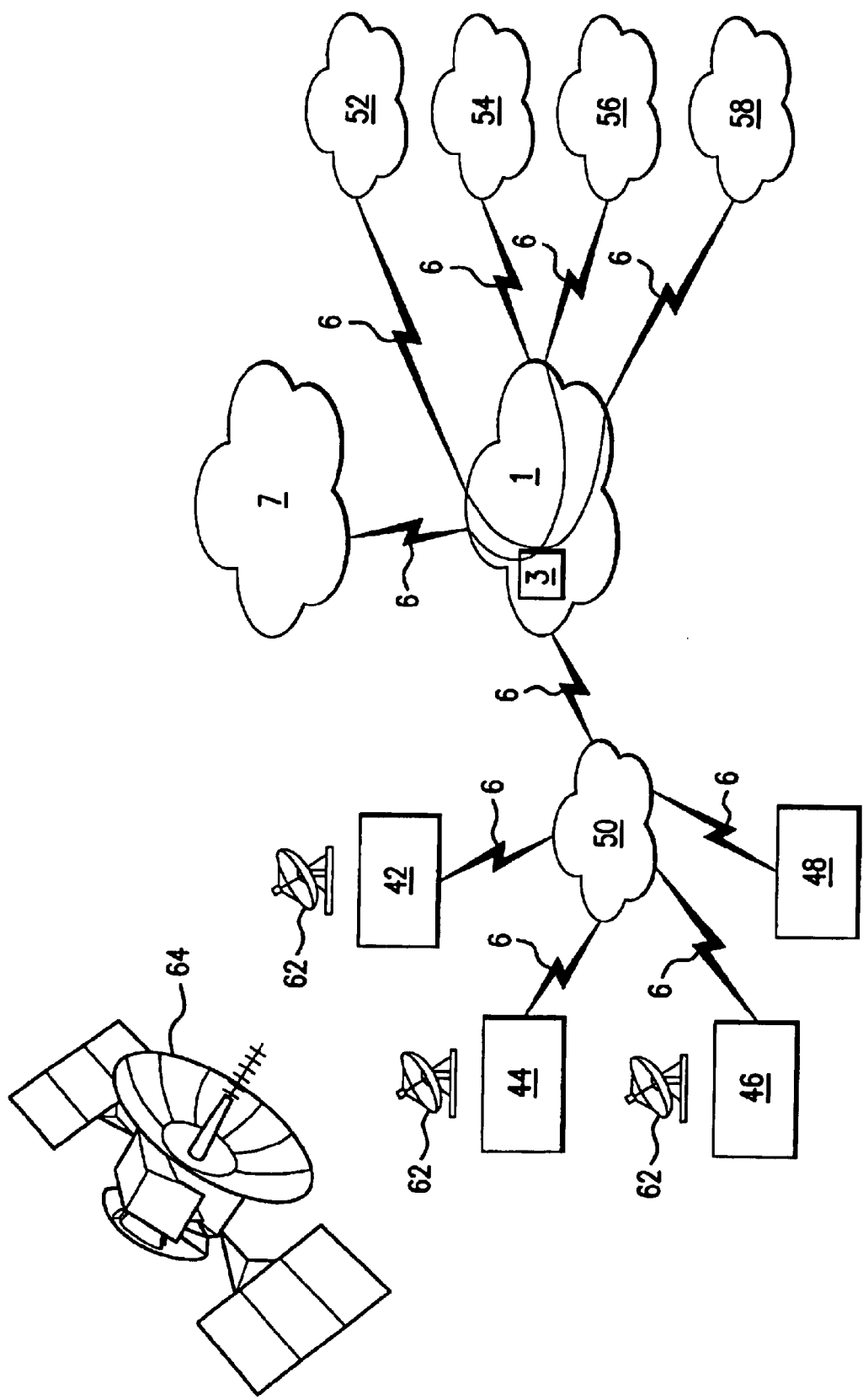
FIG. 4 shows a schematic diagram of an auto dealer communications network containing a network operation center according to the present invention.

FIGS. 3 and 4 contrast the prior art communications systems with a communications system centered around a network operation center according to the present invention.

FIG. 3 represents a single dealer 10 with multiple stores 42, 44, 46, 48 selling different makes of automobiles. The dealer maintains a WAN 50 which allows the stores 42, 44, 46, 48 to communicate with each other. A connection 6 is required for each store to communicate with its respective manufacturer 52, 54, 56, 58. Stores 42, 44, 46, 48 additionally must maintain a connection to an ISP 60 in order to have access to email, web and other Internet services. Each store 42, 44, 46, 48 also may maintain a satellite dish 62 to communicate via satellite 64 to its respective manufacturer 52, 54, 56, 58. Thus a single dealer with four stores 42, 44, 46, 48 must have a WAN 50, four connections 6 to manufacturers, satellite dishes 62 and four ISP connections 6.

In contrast, FIG. 4 shows the same dealer with the same four stores 42, 44, 46, 48 communicating through a network operation center 1 according to the present invention. Each store 42, 44, 46, 48 communicates to the dealer's WAN 50 which, in turn, communicates to the network operation center 1. A firewall 3 provides security between the WAN 50 and the Internet 7 and the manufacturers 52, 54, 56, 58. Rather than having a connection 6 between each store 42, 44, 46, 48 and its respective manufacturer 52, 54, 56, 58, the stores 42, 44, 46, 48 communicate with the manufacturers through the network operation center 1. Similarly, rather than contracting with an ISP 60, the dealer may access the Internet 7 through the network operation center 1. Satellite communication facilities 62, 64 may still be necessary, but the overall effect is to greatly simplify the communication systems necessary for the dealer.

The default communication between zones may be outlined by three relationships. The public DMZ may communicate to the outside world and the private DMZ but has no access to the internal network. The internal network may initiate communications with all networks but the public network may only communicate with the public DMZ. This provides internal hosts with the ability to directly access other hosts on the Internet for outbound connections only. This is outlined below as part of the discussion of network address translation.

The security should be able to control communication between two internal networks. That is, two automobile dealerships with two different owners should not have uncontrolled access to each other's networks. External to external communications, such as Internet to manufacturer or manufacturer to manufacturer communications, should be controlled as well. Finally, internal to external communications, such as from dealership to a manufacturer should be controlled. This security may be provided via firewalls, packet filtering and route filtering.

Additionally, security should prevent Internet probes through the use of anti-spoofing filters and automated monitoring tools to ensure that the inside hosts are protected. Since each auto dealership is connected to the internal network directly, and the firewalls 36, 38 are not accessed for internal network communication, these firewalls are not utilized to protect dealerships from each other. Therefore, a combination of routing information filters and router access-lists may be used so that the private core access routers may prevent dealership to dealership communication. Since manufacturers communicate from externally to the network operation center, the firewalls may be sufficient to prevent manufacturer to manufacturer communication. Finally, the firewalls may restrict unauthorized dealers from accessing the manufacturer connections.

As noted above, conventional computer communication systems for voice and data present a problem in that a dealership must own and maintain a router, DSU/CSU and software. As a result, the dealer is then responsible for upgrading the hardware and software associated with the communications system. This presents a problem because many automobile dealers do not want to undertake the information technology maintenance and management functions in-house.

Each dealership may have a central business office. A portal router is installed in each dealership's central business office to provide connectivity, such as a frame relay or dialup connectivity, to the network operation center. This router corresponds to reference numeral 12 in FIG. 1. In order for the network to support all connections without loss of service the frame relay port over-subscription ratio will preferably be less than 400% and the aggregate of permanent virtual circuit committed information rates will not exceed the port speed. For example, for a single T1 connection, and a 128K frame relay connection with a CIR of 32K, no more than 48 central business offices should be supported. With connections at 256K/64K only 24 central business offices should be supported. This scales directly such that 576 offices with 128K/64K and 12 T1 lines, or 288 offices connecting at 256K/64K may be supported. Higher speed lines provide the ability to support greater numbers of offices. A single T3 may support 625 128K/32K offices or 313 256K/64K offices, while four T3s could support 2500 128K/32K offices or 1252 256K/64K offices.

The router 12 in each office could be for example a Cisco brand router selected to meet each dealership's needs. For example, an auto dealership with a need to serve 6 remote locations could use a Cisco 1720/50 router with 16 MB of DRAM and Flash memory, providing a total WAN bandwidth of 768K. To serve 24 remote locations with a total WAN bandwidth of 1544K a Cisco 2611/21 router with 16 MB of DRAM and Flash memory would be sufficient. For 48 remote locations and 2×1544K total WAN bandwidth, a Cisco 3640 with 32 MB of DRAM and 16 MB of flash memory could act as the router 12.

The routers at the network operation center, corresponding to reference numeral 30 in FIG. 2, are preferably an array of smaller routers, rather than a few high power routers. Such an arrangement allows lower costs, better resilience and resistance to equipment failures, spreads traffic loads to multiple processors and circumvents sub-interface count restrictions. For every three T1s, or for each T3, a Cisco 3640 router having 64 MB DRAM and 16 MB flash memory and providing total bandwidth of 3×1544 KB (for T1s) or 1×20 MB (for T3) may be employed as the network operation center routers.

It is preferable to only support IP routing, however other protocols could be allowed to traverse the network through IP tunnels. Further, it is preferable that EIGRP and static routing be the primary routing protocols.

Auto dealerships advertise their local networks to the network operation center. The routers at the network operation center do not advertise these networks to other dealerships however. In the case that a dealership would like to use a publicly accessible IP address, the interface between the dealership and the network operation center will preferably make use of an isolation router and network address translation.

By using network address translation at the firewall, many internal hosts may initiate connections to the Internet by hiding their internal addresses behind one public address. This is known as address overloading. This enhances security because connections cannot be easily initiated in the reverse direction. However, a static translation from a unique public IP address is necessary for a host in an auto dealership to be accessed from the Internet. It is preferable for such a host to be placed in the public DMZ rather than within the dealership's private network.

It is preferable, when scaling, for each firewall to support up to about 50 auto dealerships, using, for example, Checkpoint Firewall-1 on a SUN workstation.

The firewall may be set to be open, allowing access by auto dealerships to most Internet accessible services. Alternatively, permissions may be grouped into automotive sites, or non-restricted, or some in between grouping of accessible sites. This allows auto dealerships to have access to appropriate tools without allowing employees unrestricted Internet access which could have an impact on productivity.

It is preferable to provide centralized IP management. To allow for additional dealerships to join the network a scalable system is preferred. Scalable, centralized IP management software is available, for example, Lucent Technology's QIP Enterprise 5.0. This type of software provides a scalable enterprise IP address management system. It accommodates a range of IP addressing requirements, such as static and dynamic addressing. It allows complete, up to date, consistent IP addressing information within the network operation center and can provide detailed and accurate IP reports.

To provide service more easily, it is preferable that the network operation center may include monitoring, including remote Telnet, FTP, TFTP, HTTP and other access protocols for a network management team to access the network operation center. Further SNMP management via a workstation located in the network operation center and remotely accessible may poll selected network devices. Servers, switches, routers and other such devices will be monitored since they are local to the SNMP management stations. Preferably, only the router and first switch of each dealership network will be polled, due to limited bandwidth.

It is preferable that all major manufacturers of automobiles and parts be accessible through the network operation center. Specifically, General Motors, BMW, Ford, Toyota, Land Rover, Honda, Nissan, Kia, Daimler-Chrysler, and all their allied companies such as Infiniti, Acura and others would beneficially have connections to the network operation center. Further, such allied businesses as GMAC, Ford Finance and other vendors of goods and services could be included.

It should be evident to one skilled in the art that the above embodiment may be scaled to include a larger number of routers and servers. What is important however, is for the maintenance of a public and private DMZ and for the routing of queries to be securely managed such that private information remains private while allowing public information to be distributed.

The network operation center invention can be embodied by a programmable network operation center apparatus, or by a communication method executed by such a network operation center apparatus, or by computer-readable memory media carrying instructions that can direct the programmable network operation center apparatus to execute a similar method, for example.

B. Integrated Voice and Data System

The network operation center of the present invention lends itself to a business model which offers a solution to this problem and has advantages for the network service provider, the auto manufacturers, and the auto dealerships. In one embodiment of the present invention, a single provider leases the data lines, the DSU/CSU, router, and any other equipment to a plurality of auto dealerships. The provider additionally may maintain the network operation center and its associated software. The provider may also provide network support to the dealerships for their local networks. The provider may also provide software applications at the dealership for dealership purposes. All or part of the leased technology may be periodically upgraded or "refreshed" by the provider. Preferably, a schedule may be set to provide for hardware and software upgrades every three years, for example. Further, since the network operation center carries the largest portion of the computing load, the peripheral hardware located on the dealer's premises need not be the most up to date.

In another embodiment of the present invention, there is no network operation center, but a single provider does lease to the automobile dealer an integrated voice and data communications system (IVDS), including equipment such as data lines, DSU/CSUs, routers, and related services such as long distance service, local access service, and communication line service. The provider may also provide software applications at the dealership and periodically refresh (upgrade) all or part of the technology.

Figure 5:
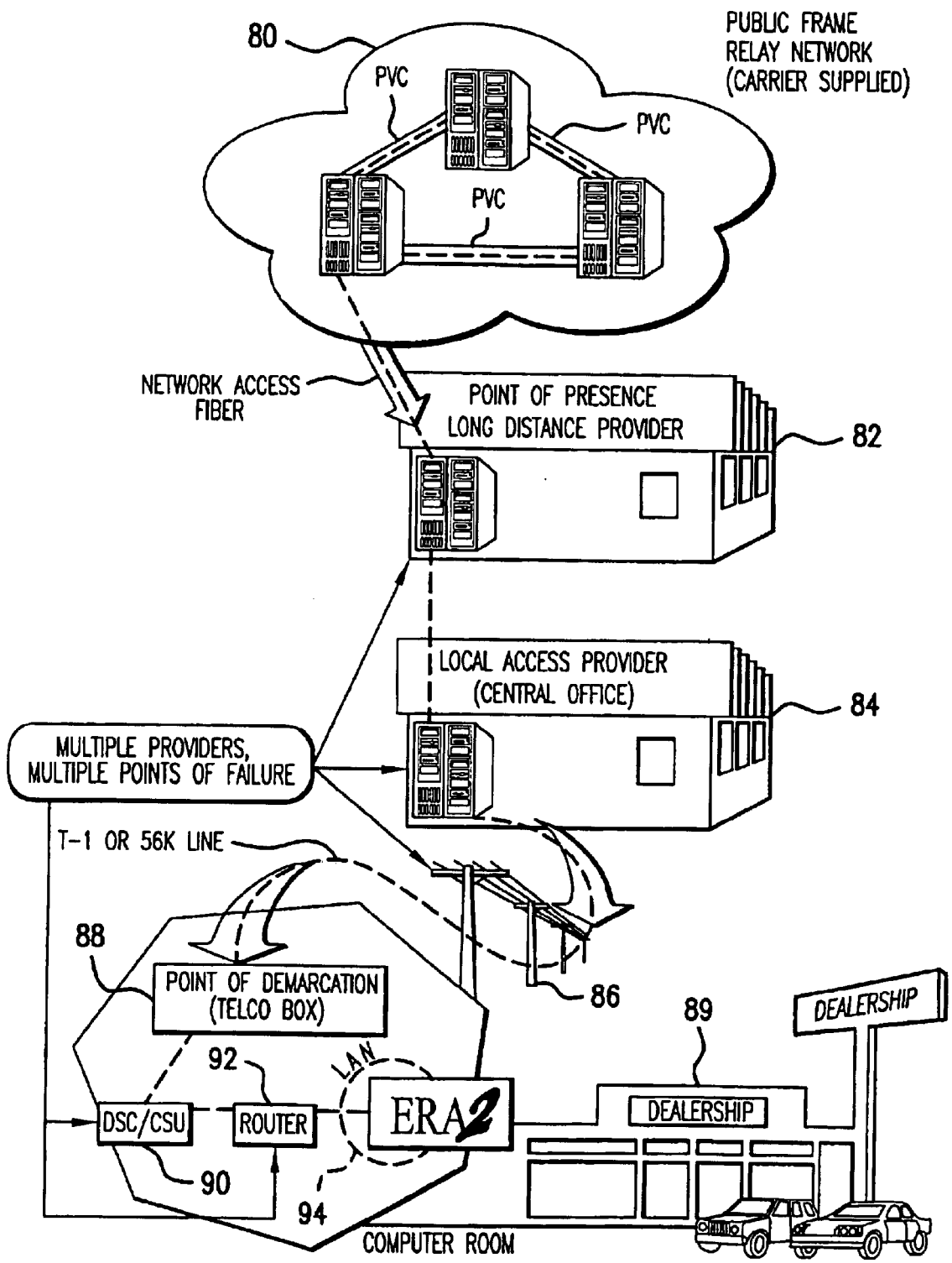
FIG. 5 shows a schematic diagram of a prior art system for providing telecommunications service to an auto dealership.

Referring now to FIG. 5, a conventional system for providing telecommunications service to an auto dealership is shown. A public frame relay network 80, such as one operated by MCI WorldCom is connected to a plurality of points of presence 82 (only one of which is shown in the Figure) belonging to a long distance provider. Each point of presence 82 is further connected to a local access provider's central office 84. The local access provider 84 owns transmission lines 86, which are represented in the Figure as above-ground copper wire or T-1 lines, but may be any type of local transmission lines. The local access provider 84 delivers service to a telephone box 88 located at the auto dealer's premises 89. The dealer operates a DSU/CSU 90 which provides communication to a router 92 which, in turn, communicates with the dealer's LAN (not shown). The LAN may have installed a variety of applications 94 such as Reynolds and Reynolds ERA or other auto dealer applications. Under this model of service delivery, one company provides applications 94; the dealer is responsible for purchasing hardware, including the router 92 and DSU/CSU 90;

a local access provider 84 delivers local phone service and access to a long distance provider 82; a long distance provider 82 delivers long distance phone service and provides access to its public frame relay network 80 (or one operated by another provider). When a dealer is presented with a problem in network access it is unclear which is the responsible party. A call to the local access provider may simply result in a referral to the long distance access provider. Each layer of provider may deny responsibility and send the dealer to yet another provider in search of the problem. Further, billing becomes complicated. Multiple bills from multiple sources are required and each is conventionally quite long.

Figure 6:
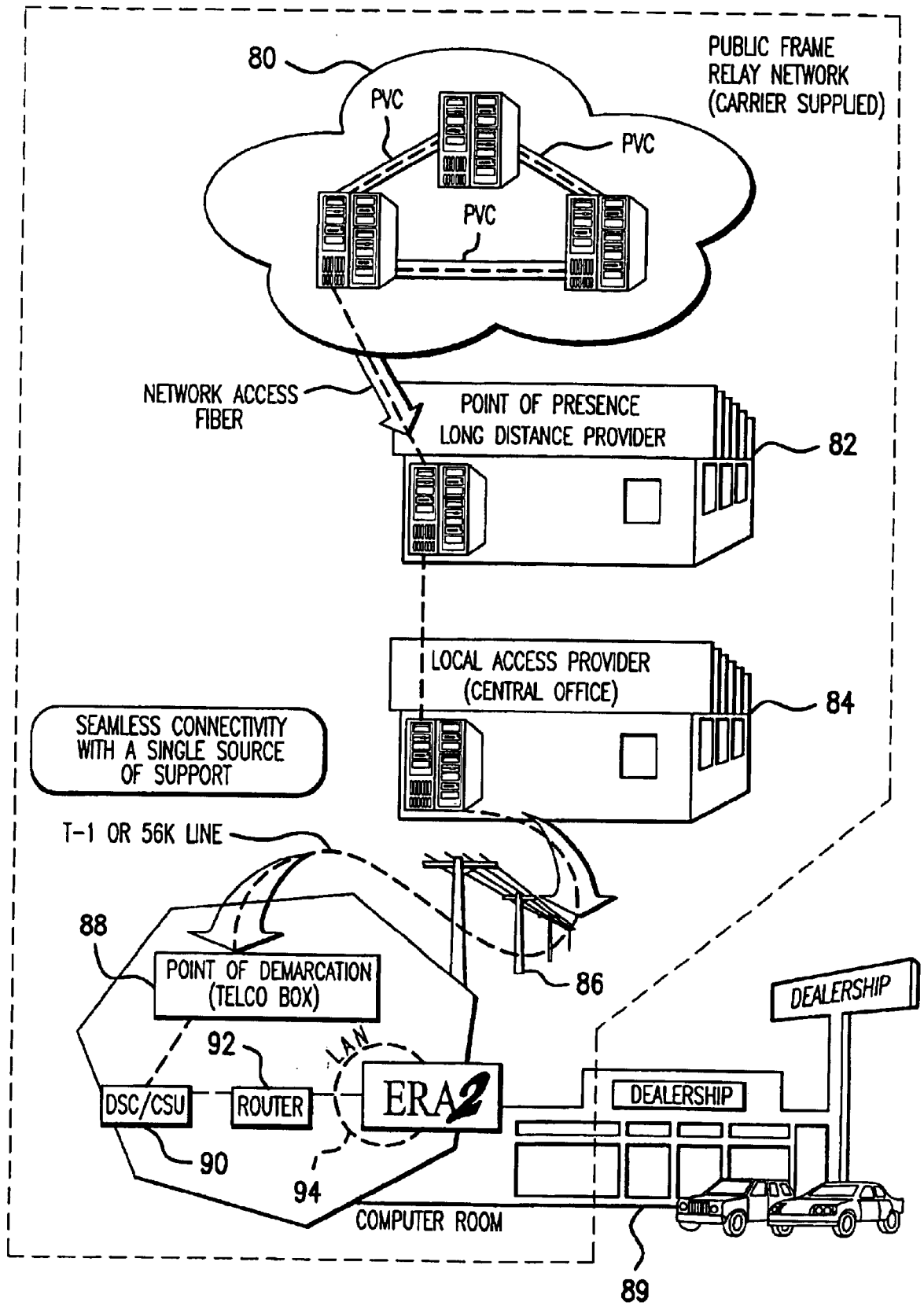
FIG. 6 shows a schematic diagram of a system for providing telecommunications service to an auto dealership according to the present invention.

Referring now to FIG. 6, a system for providing telecommunications according to the present invention is provided. Each of the physical elements of the diagram are the same as those shown in FIG. 5 and are numbered in corresponding fashion. However, in the present invention, a single provider provides to the auto dealer the software applications 94, the router 92, the DSU/CSU 90, the local access 88, 86, and the long distance access, including access to the public frame relay network 80. This model presents the auto dealer with all of the necessary telecommunications services from a single provider. The advantages include single point of contact for support, that is, any problem with the communications system is reported to a single provider who then is able to work to correct it. Billing becomes simple and straightforward because a single monthly statement may be provided from a single source, covering all services. Preferably, telecommunication service, equipment rental, software and support services would all be combined into a single, flat monthly fee. Alternately, the monthly fee may be flat for equipment and service, but variable based on usage of telecommunications access time and bandwidth. In the latter case, a monthly bill would reflect a combination of the flat equipment and a variable access fee. Within a flat fee arrangement, it is preferable to provide, within the same pricing scheme, periodic upgrades or technology refresh wherein obsolete technology is replaced with modern technology including routers, DSU/CSU and software upgrades.

FIG. 7 shows an additional telecommunications solution of the present invention, for automobile dealers, that is, wireless bridging. As noted above, a single dealer may have several stores connected by a WAN. In some cases, multiple stores are substantially co-located in a campus configuration. In other cases, a single store has multiple buildings, such as a used car facility and a new car facility. When these buildings are located close together, they may beneficially be connected through a LAN or a campus network which consists of one or more local area networks and bridging and routing equipment. Bridging is conventionally provided via land lines such as copper wire or optical fiber. As shown in FIG. 7, the present invention includes the use of wireless bridging between nearby stores or buildings within a single store.

A first store 100 has an antenna 102 for broadcasting and receiving radio signals containing network packets. A second store 106, preferably located within approximately one-half mile of the first store likewise has an antenna 104 for broadcasting and receiving radio signals containing network packets. The antennae 102, 104 must have a clear line of sight to each other so that the signal is not obstructed. Preferably, this service is provided for a single monthly fee, though a installation fee may well be charged in addition. The monthly fee preferably includes service and support and is preferably included within the overall telecommunications monthly fee discussed above. That is, a single monthly fee would include lease of a router, DSU/CSU dealer software application, telecommunications service including local access, long distance access and frame relay network access, wireless bridging equipment and service, service and support for all the above mentioned components, as well as periodic upgrades of obsolete equipment.

In one embodiment, a method of delivering data communications services according to the present invention includes acquiring long distance data communication services from a long distance carrier. Preferably, the long distance carrier has a public frame relay network. Additionally, local access to data communications services to the long distance carrier are acquired from a local access provider. Data communication line services between the local access provider and a user location are acquired from a data communication line services provider. A DSU/CSU or other communications unit, router and a data communication line connection are installed at the user location and are connected to the data communication line provider's line. Data software applications are installed at the user location and data is communicated electronically between the software applications, through the DSU/CSU, router and line connection to the data communication line, to the local access provider to the long distance frame relay network. Finally, the DSU/CSU, router line connector and data software application are leased to the user. An additional aspect of this embodiment includes reselling the long distance data services, local access services and communication line services to the user.

Advantageously, the above method may include providing short distance wireless data communications equipment which communicates between spaced portions of the user location. Specifically, the equipment communicates between the software applications. Finally, the provided wireless data communications equipment is leased to the user.

Another aspect of this embodiment of the present invention includes the use of a frame relay connection as the communication line connection and use of a T-1 line, DSL line, ISDN line, 56 k line, point to point connection or an internet link to the local access provider as the data communication line.

Preferably, the local user location is an automobile dealership location, the detached location is a detached location of the automobile dealership and is not more than about one-half mile from the user location and the data software applications are automobile dealer data applications.

The data communicated through the data communication services may include both data interpreted as numerical information and data interpreted as voice communications.

As noted above, it is preferable that at least some of the leased equipment and data software applications are periodically updated. The user may be billed periodically for the equipment and software which has been leased. Additionally, it is preferable to bill the user periodically for the services provided.

A preferable method of billing for IVDS telecommunications services, including equipment and software leased, makes use of a computer system and includes: inputting into the computer system data regarding a number of DSU/CSUs, routers, wireless communications equipment, line connections and number and type of data software applications leased to a user, for a period; inputting into the computer system the rate for the period for the user for each leased DSU/CSU, router, line connection wireless communications equipment, and data software applications; calculating a first itemized bill part for lease fees owed by the user for the period; generating the first bill part in electronic or paper form for the period for the user; and transmitting the first bill part to the user. This method may further include: inputting into the computer system the amount of long distance data services, local access service sand communications line services resold to the user, for the period; inputting into the computer system the rate for the period for the user for each of the services resold to the user; calculating a second itemized bill part for the resold services owed by the user for the period; generating the second bill part in electronic or paper form for the period for the user; combining the second bill part with the first bill part; and transmitting the second bill part combined with the first bill part to the user as one bill.

The invention embodied by the preceding billing method may also be embodied by a computer system programmed to execute a similar method, and by machine readable memory media carrying instructions for a computer system to execute the method, for example.

The above described embodiments are intended by way of example only and it will be understood by those skilled in the art that further modifications and changes are contemplated and may be made within the principals of the present invention without departing from the true spirit and scope thereof, as defined in the following claims.

We claim:

1. A programmable network operation center apparatus, comprising:

(a) a plurality of connections to a plurality of external computer systems;

(b) wherein a number of the external computer systems are operated by automobile dealers using dealer software;

(c) wherein a second number of the external computer systems are operated by different automobile manufacturers using manufacturer software;

(d) wherein a third number of the external computer systems are operated by vendors of goods and services used in the automotive industry using vendor software;

(e) wherein the external computer systems have an element selected from the group comprising incompatible software, incompatible data structures, and incompatible data formats;

(f) means to receive information from an external computer system operated by an automobile dealer and transmit the information to an external computer system selected from the group comprising the second number of external computer systems and the third number of external computer systems;

(g) means to receive information from an external computer system selected from the group comprising the second number of external computer systems, and the third number of external computer systems, and transmit the information to an external computer system operated by an automobile dealer;

(h) means to translate information between incompatible dealer software, manufacturer software and vendor software operating on the external computer systems;

(i) means to provide additional services to the external computer systems, selected from e-mail, Internet access, firewall, instant messaging, and Internet telephony;

means to transmit voice communications between the external computer systems;

(k) wherein incompatible data structures are flat file and relational databases;

(l) wherein data is passed to and from an automobile dealer by a frame relay connection which is connected to a DSU/CSU which is located on premises of the automobile dealer, the DSU/CSU further being connected to a co-located router; and (m) wherein the DSU/CSU, router and frame relay connection are leased to the dealer by an operator of the network operation center.

2. A programmable network operation center apparatus, comprising:

(a) a plurality of electronic communication connections to a plurality of external computer systems;

(b) wherein a number of the external computer systems are operated by automobile dealers using dealer software;

(c) wherein a second number of the external computer systems are operated by different automobile manufacturers using manufacturer software;

(d) wherein a third number of the external computer systems are operated by vendors of goods and services used in the automotive industry using vendor software;

(e) wherein the external computer systems have an element selected from the group comprising incompatible software, incompatible data structures, and incompatible data formats;

(f) means to receive information from an external computer system operated by an automobile dealer and transmit the information to an external computer system selected from the group comprising the second number of external computer systems and the third number of external computer systems;

(g) means to receive information from an external computer system selected from the group comprising the second number of external computer systems and the third number of external computer systems, and transmit the information to an external computer system operated by an automobile dealer; and (h) means to translate information between incompatible dealer software, manufacturer software and vendor software operating on the external computer systems.

3. A programmable network operation center apparatus as in claim 2 wherein the incompatible data structures are flat file and relational databases.

4. A programmable network operation center apparatus as in claim 2, further comprising, means to provide additional services to the external computer systems, selected from e-mail, Internet access, firewall, instant messaging, and Internet telephony.

5. A programmable network operation center apparatus as in claim 2 wherein data is passed to and from an automobile dealer by a frame relay connection which is connected to a DSU/CSU which is located on premises of the automobile dealer, the DSU/CSU further being connected to a co-located router.

6. A programmable network operation center apparatus as in claim 5 wherein the DSU/CSU, router and frame relay connection are leased to the dealer by an operator of the network operation center.

7. A programmable network operation center apparatus as in claim 2, further comprising means to transmit voice communications between the external computer systems.

8. A communication method in a programmable network operation center apparatus comprising:

(a) providing a plurality of connections to a plurality of external computer systems from a programmable network operation center;

(b) wherein a number of the external computer systems are operated by automobile dealers using dealer software;

(c) wherein a second number of the external computer systems are operated by different automobile manufacturers using manufacturer software;

(d) wherein a third number of the external computer systems are operated by vendors of goods and services used in the automotive industry using vendor software;

(e) where in the external computer systems have an element selected from the group comprising incompatible software, incompatible data structures, and incompatible data formats;

(f) receiving information from an external computer system operated by an automobile dealer and transmitting the information to an external computer system selected from the group comprising the second number of external computer systems and the third number of external computer systems;

(g) receiving information from an external computer system selected from the group comprising the second number of external computer systems and the third number of external computer systems, and transmitting the information to an external computer system operated by an automobile dealer;

(h) means to translate information between incompatible dealer software, manufacturer software and vendor software operating on the external computer systems;

(i) providing additional services to the external computer systems selected from e-mail, Internet access, firewall, instant messaging, and Internet telephony;

(j) transmitting voice communications between the external computer systems;

(k) wherein incompatible data structures are flat file and relational databases;

(l) passing data to and from an automobile dealer by a frame relay connection which is connected to a DSU/CSU which is located on premises of the automobile dealer, the DSU/CSU further being connected to a co-located router; and (m) wherein the DSU/CSU, router and frame relay connection are leased to the dealer by an operator of the network operation center.

9. A communication method in a programmable network operation center apparatus comprising:

(a) providing a plurality of electronic communication connections to a plurality of external computer systems from the programmable network operation center;

(b) wherein a number of the external computer systems are operated by automobile dealers using dealer software;

(c) wherein a second number of the external computer systems are operated by different automobile manufacturers using manufacturer software;

(d) wherein a third number of the external computer systems are operated by vendors of goods and services used in the automotive industry using vendor software;

(e) wherein the external computer systems have an element selected from the group comprising incompatible software, incompatible data structures, and incompatible data formats;

(f) receiving information from an external computer system operated by an automobile dealer and transmitting the information to an external computer system selected from the group comprising the second number of external computer systems and the third number of external computer systems;

(g) receiving information from an external computer system selected from the group comprising the second number of external computer systems and the third number of external computer systems, and transmitting the information to an external computer system operated by an automobile dealer; and (h) means to translate information between incompatible dealer software, manufacturer software and vendor software operating on the external computer systems.

10. A communication method in a programmable network operation center apparatus as in claim 9 wherein the incompatible data structures are flat file and relational databases.

11. A communication method in a programmable network operation center apparatus as in claim 9 further comprising providing additional services to the external computer systems, selected from e-mail, Internet access, firewall, instant messaging, and Internet telephony.

12. A communication method in a programmable network operation center apparatus as in claim 9 further comprising passing data to and from an automobile dealer by a frame relay connection which is connected to a DSU/CSU which is located on premises of the automobile dealer, the DSU/CSU further being connected to a co-located router.

13. A communication method in a programmable network operation center apparatus as in claim 12 further comprising an operator of the network operation center apparatus leasing the DSU/CSU, router and frame relay connection to the dealer.

14. A communication method in a programmable network operation center apparatus as in claim 9 further comprising transmitting voice communications between the external computer systems.

15. A computer-readable medium encoded with data representing instructions for a programmable apparatus, that can be used to direct a programmable network operation center apparatus including a plurality of connections to a plurality of external computer systems, wherein a number of the external computer systems are operated by automobile dealers using dealer software, a second number of the external computer systems are operated by different automobile manufacturers using manufacturer software, wherein a third number of the external computer systems are operated by vendors of goods and services used in the automotive industry using vendor software, wherein the external computer systems have an element selected from the group comprising incompatible software, incompatible data structures, and incompatible data formats, comprising:

(a) means for receiving information from an external computer system operated by an automobile dealer and transmitting the information to an external computer system selected from the group comprising the second number of external computer systems and the third number of external computer systems;

(b) means for receiving information from an external computer system selected from the group comprising the second number of external computer systems and the third number of external computer systems, and transmitting the information to an external computer system operated by an automobile dealer;

(c) means to translate information between incompatible dealer software, automobile manufacturer software and vendor software operating on the external computer systems;

(d) means for providing additional services to the external computer systems selected from e-mail, Internet access, firewall, instant messaging, and Internet telephony;

(e) means for transmitting voice communications between the external computer systems; and (f) means for passing data to and from an automobile dealer by a frame relay connection which is connected to a DSU/CSU which is located on premises of the automobile dealer, the DSU/CSU further being connected to a co-located router;

wherein incompatible data structures are flat file and relational databases; and the DSU/CSU, router and frame relay connection are leased to the dealer by an operator of the network operation center.

16. A computer-readable medium encoded with data representing instructions for a programmable apparatus, that can be used to direct a programmable network operation center apparatus including a plurality of connections to a plurality of external computer systems, wherein a number of the external computer systems are operated by automobile dealers using dealer software, a second number of the external computer systems are operated by different automobile manufacturers using manufacturer software, wherein a third number of the external computer systems are operated by vendors of goods and services used in the automotive industry using vendor software, wherein the external computer systems have an element selected from the group comprising incompatible software, incompatible data structures, and incompatible data formats, comprising:

(a) means for receiving information from an external computer system operated by an automobile dealer and transmitting the information to an external computer system selected from the group comprising the second number of external computer systems and the third number of external computer systems;

(b) means for receiving information from an external computer system selected from the group comprising the second number of external computer systems and the third number of external computer systems, and transmitting the information to an external computer system operated by an automobile dealer; and (c) means to translate information between incompatible dealer software, automobile manufacturer software and vendor software installed on the external computer systems.

17. A medium according to claim 16 wherein the incompatible data structures are flat file and relational databases.

18. A medium according to claim 16, further comprising, means for providing additional services to the external computer systems selected from e-mail, Internet access, firewall, instant messaging, and Internet telephony.

19. A medium according to claim 16, further comprising, means for transmitting voice communications between the external computer systems.

20. A medium according to claim 16, further comprising, means for passing data to and from an automobile dealer by a frame relay connection which is connected to a DSU/CSU which is located on premises of the automobile dealer, the DSU/CSU further being connected to a co-located router.

21. A medium according to claim 20 wherein the DSU/CSU, router and frame relay connection are leased to the dealer by an operator of the network operation center.

22. A communications service system comprising:

(a) a programmable network operation center apparatus;

(b) a computer system remote from the programmable network operation center apparatus communicating electronically with the programmable network operation center and using at least one of dealer software, automobile manufacturer software, and vendor software, the programmable network operating center being configured to translate information between incompatible dealer software, manufacturer software, and vendor software;

(c) a DSU/CSU, router and frame relay connection connecting the programmable network operation center apparatus and the computer system remote from the programmable network operation center apparatus;

the router and DSU/CSU being co-located with the computer system remote from the programmable network operation center apparatus, wherein the DSU/CSU, router and frame relay connection are leased to the owner of the computer system remote from the programmable network operation center apparatus and not owned by the owner of the computer system remote from the programmable network operation center apparatus.

23. A communications service system as in claim 22, wherein software and hardware of the computer system remote from the programmable network operation center apparatus, the DSU/CSU, the router, and the frame relay connection are periodically upgraded by the owner of the leased DSU/CSU, router and frame relay connection or the operator of the programmable network operation center apparatus.

24. A communications service system as in claim 22 wherein the programmable network operation center apparatus is connected with automobile manufacturers, dealers and vendors and the computer system remote from the programmable network operation center apparatus is located at a dealer and the DSU/CSU, the frame relay connection and the router are leased to the dealer.

25. A method of delivering data communication services, comprising:

(a) acquiring long distance data communication services from a long distance carrier with a public frame relay network;

(b) acquiring local access to data communications services to the long distance carrier, from a local access provider;

(c) acquiring data communication line services between the local access provider and a user location, from a data communication line services provider;

(d) installing a DSU/CSU, router, and a data communication line connection at the user location, connected to the data communication line provider's line;

(e) installing data software applications selected from the group comprising dealer software, manufacturer software, and vendor software at the user location, communicating data electronically between the software applications, through the DSU/CSU, router and line connection, to the data communication line, to the local access provider, to the long distance frame relay network;

wherein communicating data electronically between the software applications includes translating information between incompatible dealer software, manufacturer software, and vendor software; and (f) leasing the DSU/CSU, the router, line connection, and data software application, to the user.

26. A method of delivering data communication services according to claim 25, further comprising:

reselling the long distance data services, local access services, and communication line services to the user.

27. A method of delivering data communication services according to claim 25, further comprising:

installing short distance wireless data communications equipment communicating between the software applications at the user location; and leasing the wireless data communication equipment to the user.

28. A method of delivering data communication services according to claim 25, wherein:

the communication line connection is a frame relay connection; and the data communication line is selected from a T-1 line, a 56 k line, a DSL line, a ISDN line, point to point connection, and an internet link to the local access provider.

29. A method of delivering data communication services according to claim 25, wherein:

the user location is an automobile dealership location; and the data software applications are automobile dealer data applications.

30. A method of delivering data communication services according to claim 25, wherein the data includes both data interpreted as numerical information and data interpreted as voice communications.

31. A method of delivering data communication services according to claim 25, wherein at least some of the leased equipment and data software applications are periodically updated.

32. A method of delivering data communication services according to claim 25, further comprising billing the user periodically for the equipment and software leased.

33. A method of delivering data communication services according to claim 32, further comprising billing the user periodically for the services provided.

* * * * *